Dec. 17, 1940.  C. T. RAY  2,225,393
TRACTOR ATTACHMENT
Filed June 30, 1938  3 Sheets-Sheet 3
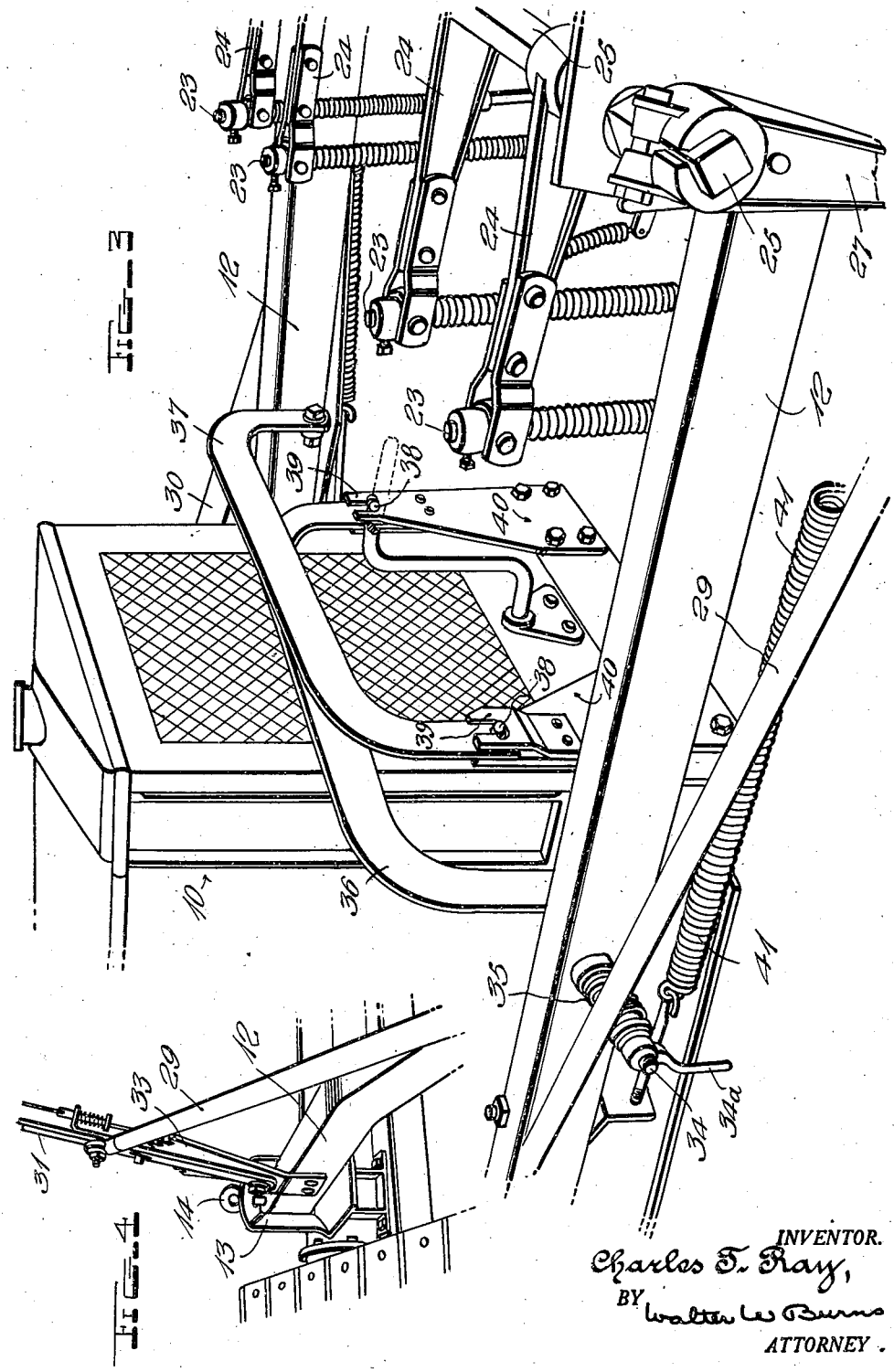
INVENTOR.
Charles T. Ray,
BY Walter L. Burns
ATTORNEY.

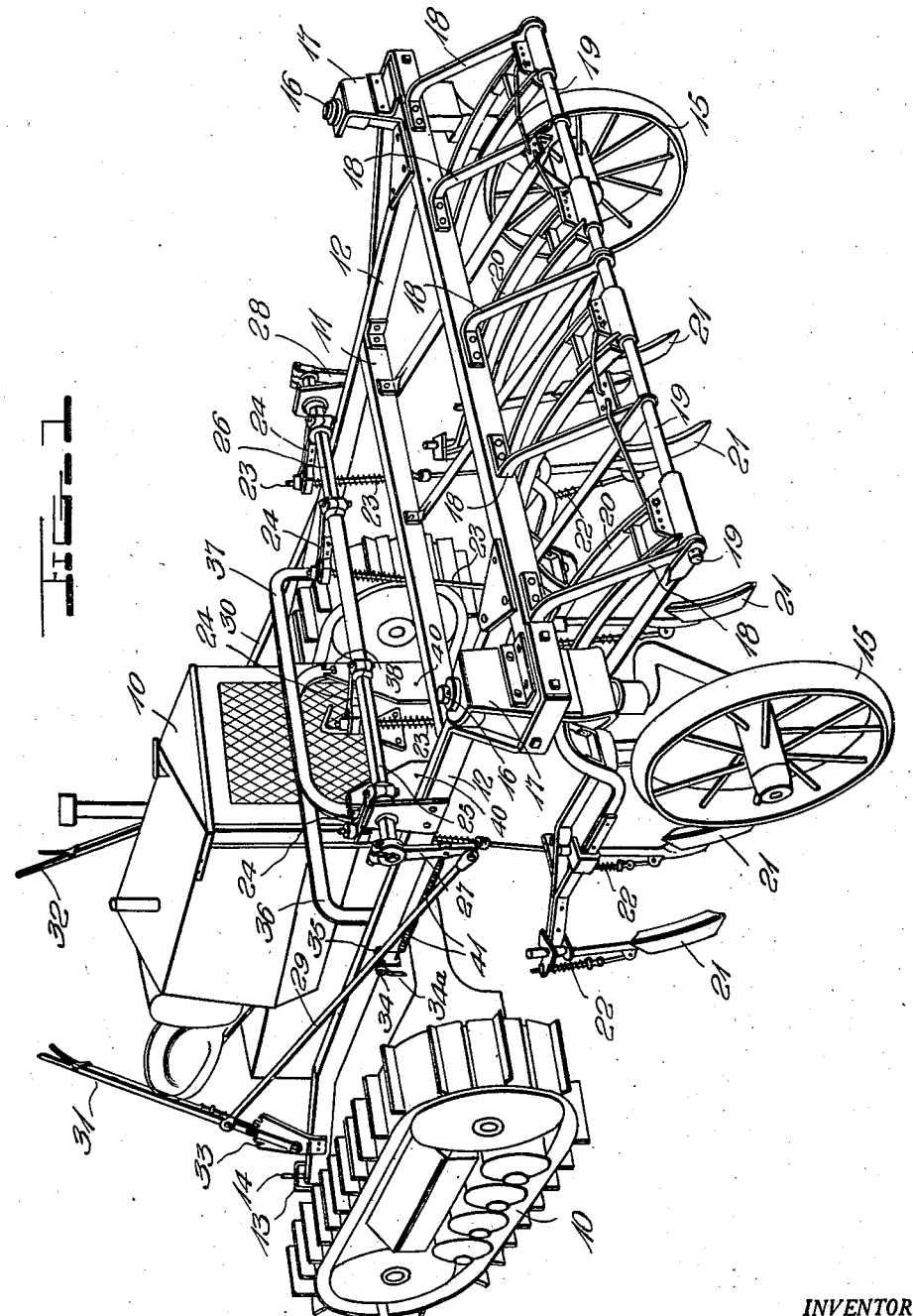

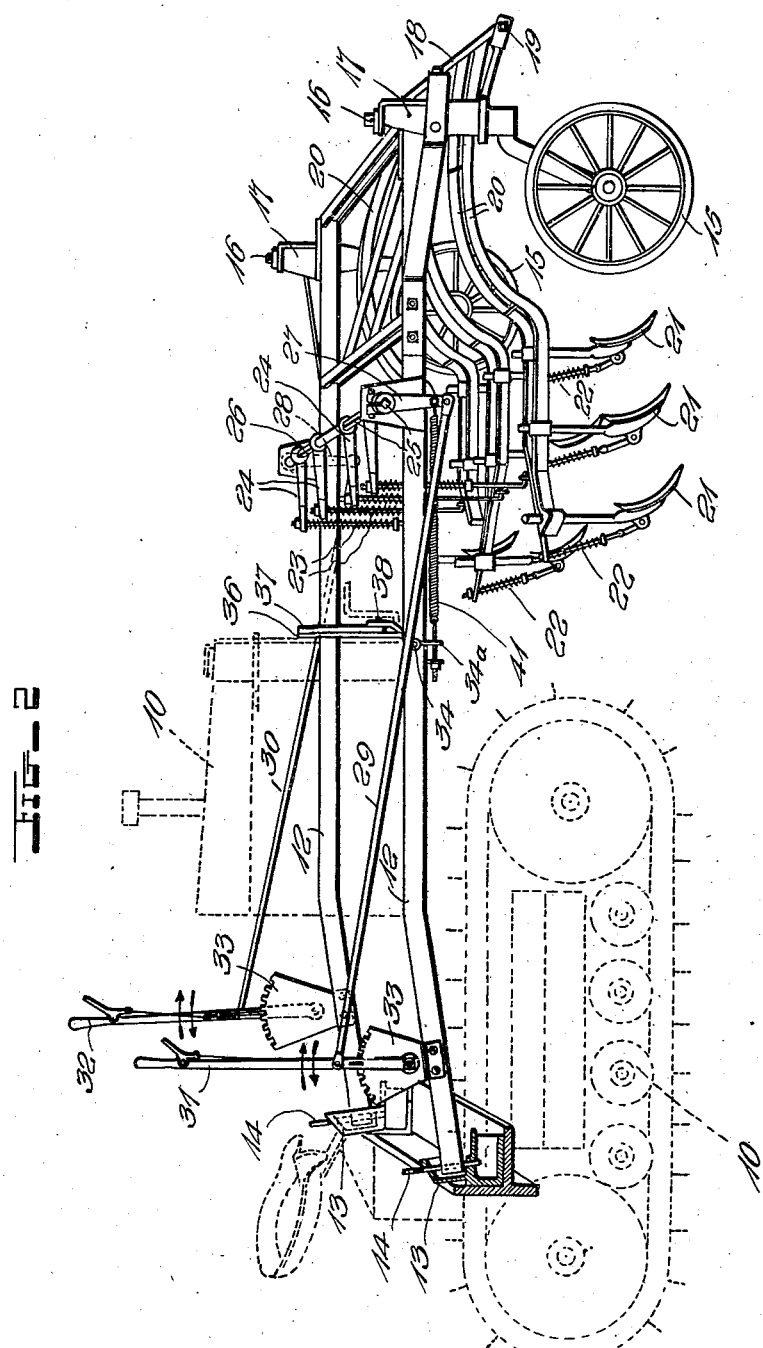

Patented Dec. 17, 1940

2,225,393

UNITED STATES PATENT OFFICE 2,225,393

TRACTOR ATTACHMENT

Charles T. Ray, Louisville, Ky., assignor to B. F. Avery and Sons Company, Louisville, Ky., a corporation of Delaware Application June 30, 1938, Serial No. 216,801

11 Claims. (Cl. 97—47)

This invention relates to tractor attachments and particularly to attachments intended for use in working the ground.

Attachments for tractors which work the ground are necessarily made of steel to withstand the strains and must, in order to be used efficiently, be light and easily maneuvered in the soft ground.

In the past, difficulty has been experienced in making machines of this character which will be sufficiently rigid to withstand the twisting action on the parts when in use, and yet be light enough to turn easily in soft soil and on a short radius.

Another difficulty in this type of machine has been in separating the tractor from the farm machine and in connecting it again when this becomes necessary.

The primary object of this invention is the provision of an improved connection between a tractor and a farm device.

Another object of the invention is the provision of a frame of a farm machine having means for connection to a tractor and a hand controlled element for raising and lowering a ground engaging device and for relieving pressure on the means which connects the tractor and farm machine together.

A further object of the invention is the provision of an improved attachment for a tractor wherein the operating mechanism is forward of the tractor, and wherein two frame members extend for connection to the rear of the tractor with connections from the sides of the frame to the forward part of the tractor, the connections being such as to permit free upward and downward movement of the forward part of the tractor without putting the attachment out of alignment with the tractor.

A still further object of the invention is the provision of an attachment having earth working means with an operating means adjacent the operator's seat which upon movement will place the earth working means in contact with the ground and upon further movement will lift the rear end of the frame so that it has no downward pressure at its tractor connection, thus making the separation of the tractor and frame an easy operation.

Other and further objects will be apparent to those skilled in the art from a reading of the complete specification and claims.

Referring to the drawings wherein I have illustrated an embodiment of the invention:

Fig. 1 is a perspective view of the invention.

Fig. 2 is a side perspective view.

Fig. 3 is a front fragmental view showing the front connection.

Fig. 4 is a fragmental view of the rear tractor connection.

Similar reference characters refer to the same or similar parts throughout the specification and drawings.

In the drawings, 10 designates the tractor of a usual type which moves on its endless track in the usual and well known manner.

The machine or implement attachment for the tractor to which this invention is applied is the type which travels in front of the tractor. In this type of machine, it is necessary to support the operating parts in a manner to have them travel over the ground surface with as little change of height with relation to the ground, as is possible. The type of operating mechanism is not the important part of this invention which may be used with a tractor machine attachment carrying any one or more kinds of farm or earth working devices. By way of example, the present showing is of a cultivator. Other examples are plows, planters, and even road making machinery.

In the embodiment illustrated, the machine or implement has a frame 11 which has two rearwardly extending frame members 12 which are of a distance apart to extend upon opposite sides of the power plant portion of the tractor.

These rear ends 12 are held in place in receiving sockets 13 where they are held in place by pins 14 which are provided at their upper ends by eyes to facilitate removal.

The frame 11 is supported by the caster wheels 15 which are mounted on the spindles 16 in the bearing 17.

At the forward portion of the frame 11 is a draft frame having hangers 18 which carry at their forward ends a shaft 19. On this shaft 19 are mounted for limited rotation in a vertical plane, the implement draft bars 20. At the rear ends of these draft bars 20 are mounted the cultivator devices 21, the points of which are adjusted to the proper height. The usual shock springs 22 are provided to take the shock of any engagement with stones and other obstructions.

Supporting the rear portion of each of the frames 20 is a rod 23 which is supported at its upper end by a rocker arm 24. These rocker arms 24 are mounted in pairs on the separate sides, those on the right side of the machine being mounted on the shaft 25 and those on the left side being mounted on the shaft 26. These shafts are preferably square except at their bearings. In this way the rocker arms 24 may be adjusted along the squared portion in a well known manner.

Secured to the outer ends of the shafts 25 and 26 are respective operating arms 27 and 28. These in turn have secured to their lower ends, the rods 29, 30. At the rear ends of the respective rods 29, 30 are two operating levers 31, 32 which are mounted on suitable quadrants such as the quadrant 33 illustrated on Figs. 1 and 2. These quadrants are supported on the rearwardly extending frame members 12. A suitable latch and dog mechanism is provided on each lever 31, 32 and cooperates with the teeth of its quadrant to hold the lever 31 or 32 in its desired adjusted position.

The type of frame and its close-in structure with the construction presently to be described, makes possible a light construction. The rearwardly extending frame members 12 are provided with holes just forward of the forward portion of the tractor body. In these holes are placed the bolts, on the outer ends of which are provided springs 35 and wing nuts 34ª. On the inner ends of the bolts 34 are provided eyes to receive pivot bolts which secure the bolts 34 to the radius arms now to be described.

Radius arms 36, 37 are secured to the pivot bolts and extend inwardly. At their inner ends they are provided with lugs 38 which fit in sockets 39 of the socket plates 40. These socket plates 40 are secured to the forward end of the tractor.

As the tractor moves over the ground, it is obvious that its forward end will have more up and down movement than the rear end. For this reason, the rear ends of the frame members 12 are secured at the rear portion of the tractor and preferably at the point where the up and down movement is least in the particular tractor to be used. As the forward end of the tractor moves up and down passing over inequalities of the ground, it is obviously necessary to permit this movement to freely take place without having it, in any way, effect the height of the machine frame or the ability of the tractor to properly guide the machine.

This result is obtained by having the socket plate 40 to which the right radius arm 36 is attached, located on the left side of the tractor and the socket plate 40 which carries the left radius arm located on the right side of the tractor. It will be seen from an inspection of Fig. 3 that the longer the radius arms are made with the appropriate placing of the socket plates 40, the less will be the angularity of the radius arms for any given movement of the tractor in a vertical direction relative to the frame. And further the greater the distance apart of the sockets 39, for a given amount of vertical movement of the front of the tractor, the less will be the movement of the lugs 38 in the sockets 39 or of the bolts 34 in their openings in the frame members 12. It will be clear that with the wing nuts 34ª properly adjusted, a firm tension in the springs 35 will hold the whole attachment definitely yet resiliently in its proper relation to the tractor whether the travel is on plane or irregular ground and also when turns are made. The caster wheels 15 permit sharp turns without undue strains on the side members of the frame.

The manipulation of the levers 31, 32 will control their respective cultivator units being assisted by the counter-balance springs 41. After adjustment, the grip and detent device on the lever 31 or 32 will coact with the quadrant 33 to hold the parts in the desired adjusted positions.

When it is desired to separate the tractor from the attachment, it can be very easily and simply done by a single operator.

After the unit is moved to the place where it is desired to have the attachment left, the levers 31, 32 are moved forwardly until the reaction between the ground engaging elements 28 and the frame 11 is sufficient to give the frame members 12 a tendency to lift. It is now necessary only to lift the pins 14 from their sockets and swing the two radius arms up away from their sockets 39. The tractor may now be withdrawn, leaving the attachment standing. The center of gravity is sufficiently forward to overcome the weight of the rearwardly extending arms 12.

In connecting up the tractor, the reverse operation is followed. The tractor is run in between the rearwardly extending bars 12. If for any reason the rearwardly extending bars 12 have changed their height, they can be separately adjusted by the operation of the respective levers 31 and 32.

While I have shown and described an embodiment of my invention, it is desired that the disclosure be considered merely as illustrative and that modifications and changes may be made without departing from the spirit of the invention or its scope as claimed.

Having described my invention what I claim is:

1. In combination, a tractor, a machine or implement frame for attachment thereto, the frame having spaced rearwardly extending frame members, devices for pivotally connecting the rear portions of the frame members to the tractor, relatively stiff link means for connecting the front end of the tractor with the side of one of the rearwardly extending frame members and separate means for connecting the front end of the tractor with the side of the other rearwardly extending frame members.

2. In combination, a tractor, a machine or implement frame for attachment thereto, the frame having spaced rearwardly extending frame members, devices for pivotally connecting the rearwardly extending members to rear portions of the tractor, a pair of relatively stiff radius arms pivoted to the forward portion of the tractor and to the respective arms.

3. In combination, a tractor, a machine or implement frame for attachment thereto, the frame having spaced rearwardly extending frame members, devices for pivotally connecting the rearwardly extending members to rear portions of the tractor, a pair of relatively stiff connecting means between the forward portion of the tractor and the frame of the machine attachment and extending transversely of the machine, one of the relatively stiff connecting means extending between the right side of the machine frame and the left side of the tractor, the other extending between the left side of the machine frame and the right side of the tractor.

4. In combination, a tractor, a machine or implement frame for attachment thereto, the machine having a pair of spaced rearwardly extending frame members, pivoting means for connecting the frame members to the rear portion of the tractor and a pair of relatively stiff radius arms having independent pivotal connection with the forward portion of the tractor and extending transversely of the line of travel, the inner end of one radius arm being connected to the right side of the tractor and the left frame member, the other radius arm being connected to the left side of the tractor and at its other end to the right frame member.

5. In combination, a tractor, a machine or implement frame for attachment thereto, the machine having a pair of frame members extending on opposite sides of the tractor and having their ends secured to the rear portion of the tractor to permit relative movement in a vertical plane, a slot connection at each side of the center of the forward portion of the tractor, a pair of radius arms connected to the respective slot connections at one end and being pivoted to the frame members, one of the radius arms being connected to the right frame member and the left slot connection and the other radius arm being connected to the left frame member and the right slot connection, and resilient means at the outer end of one of the radius arms.

6. In combination, a tractor, a machine for attachment thereto, the machine having a pair of frame members extending on opposite sides of the tractor and having their ends secured to the rear portion of the tractor to permit relative movement in a vertical plane, a slot connection at each side of the center of the forward portion of the tractor, a pair of radius arms connected to the respective slot connections at one end and being pivoted to the frame members, one of the radius arms being connected to the right frame member and the left slot connection and the other radius arm being connected to the left frame member and the right slot connection and adjustable resilient means connected to one of the radius arms to vary the normal pressure between the radius arms and their end connections.

7. In combination, a tractor and an attachment therefor, the attachment including a frame, wheels supporting the forward end of the frame, a ground engaging means supported from the frame, the frame having rearwardly extending frame members, lever means adjacent the rear end of the rearwardly extending frame members, connections between the lever means and the ground engaging means to exert a supporting action on the rear end of the frame member and to raise the ground engaging means from the ground and means for attaching the frame to the tractor including securing means at the rear ends of the rearwardly extending frame members and relatively stiff radius arms pivoted to and extending inwardly of the frame members, the other ends of the radius arms being pivotally attached to the forward end of the tractor, the right radius arm being pivotally connected to the left side of the tractor and the left radius arm being pivotally connected to the right side of the tractor, the parts being so connected and proportioned that the tractor connecting members can be easily removed and the tractor withdrawn leaving the attachment standing in place, when the lever means is operated to press the ground engaging means to the ground.

8. In combination, a tractor and an attachment therefor, the attachment including a frame, wheels supporting the forward end of the frame, a ground engaging means supported from the frame, the frame having rearwardly extending frame members, lever means adjacent the rear end of a rearwardly extending frame member, connections between the lever means and the ground engaging means to exert a supporting action on the rear end of the frame member and to raise the ground engaging means from the ground and means for attaching the frame to the tractor including securing means at the rear ends of the rearwardly extending frame members and relatively stiff radius arms connected to and extending inwardly of the frame members, the other ends of the radius arms being pivotally attached to the forward end of the tractor, the right radius arm being connected to the left side of the tractor and the left radius arm being attached to the right side of the tractor.

9. A tractor attachment comprising a supporting frame, forward supporting wheels for the frame, ground working means, raising and lowering means for the ground working means, the supporting frame having a pair of rearwardly extending frame members, the rear ends of which having tractor attaching means and a lever connected to the raising and lowering means for pressing downwardly on the ground working means to cause an upward tendency of the rear ends of the rearwardly extending arms and for lifting the ground working means off the ground when the attachment is attached to a tractor, the attachment having its parts so placed as to have the center of gravity, of the attachment as a whole, between the supporting wheels and the oppositely disposed ground working means, and having all portions of the ground engaging means and raising and lowering means forward of any portion of the tractor traversing the same line of travel.

10. A tractor attachment comprising a supporting frame, forward supporting wheels for the frame, ground working means, a pair of raising and lowering means for the ground working means, the supporting frame having a pair of rearwardly extending frame members, the rear ends of which having tractor attaching means, and a lever connected to each of the raising and lowering means for pressing downwardly on the ground working means to cause an upward tendency of the rear ends of the rearwardly extending arms and for lifting the ground working means off the ground when the attachment is connected to a tractor, the attachment having its parts so placed as to have the center of gravity, of the attachment as a whole, between the supporting wheels and the oppositely disposed ground working means, and having all portions of the ground engaging means and raising and lowering means forward of any portion of the tractor traversing the same line of travel.

11. A tractor attachment comprising a supporting frame, forward supporting wheels for the frame, ground engaging means, a pair of raising and lowering means for the ground engaging means, the supporting frame having a pair of rearwardly extending frame members, the rear ends of which having attaching means for connection to the rear portion of a tractor, means for attaching to the forward portion of a tractor comprising relatively stiff radius arms pivoted to side frame members in position to extend toward each other and each being substantially longer than half the distance between the frame attaching points and a lever connected to each of the raising and lowering means for pressing downwardly on the ground engaging means to cause an upward tendency of the rearwardly extending arms and for lifting the ground engaging means off the ground when the attachment is connected to a tractor the supporting wheels and ground engaging means being so placed relative to the frame as to be able to entirely support the frame in position to insert the tractor to or remove the tractor from its operative position relative to the frame, without disturbing the equilibrium of the frame.

CHARLES T. RAY.